United States Patent [19]

Gritter

[11] Patent Number: 5,386,186
[45] Date of Patent: Jan. 31, 1995

[54] STATOR FLUX ORIENTED CONTROL

[75] Inventor: David J. Gritter, Racine, Wis.

[73] Assignee: Eaton Corporation, Cleveland, Ohio

[21] Appl. No.: 101,854

[22] Filed: Aug. 4, 1993

[51] Int. Cl.$^6$ .............................................. H02P 5/28
[52] U.S. Cl. .................... 318/798; 318/801;
318/800; 318/802; 318/803; 318/807; 318/808;
318/809; 318/810
[58] Field of Search ............... 318/798, 801, 800, 808,
318/802, 803, 807, 809, 810, 811

[56] References Cited

U.S. PATENT DOCUMENTS

| | | |
|---|---|---|
| 4,371,824 | 1/1983 | Gritter . |
| 4,602,199 | 7/1986 | Walker ............................... 318/798 |
| 4,777,422 | 10/1988 | Slicker et al. ........................ 318/800 |
| 4,958,269 | 9/1990 | Gritter . |
| 4,990,844 | 2/1991 | Gritter et al. . |
| 4,994,950 | 2/1991 | Gritter . |
| 5,003,243 | 3/1991 | Tadakuma et al. .................. 318/800 |
| 5,045,988 | 9/1991 | Gritter et al. . |

OTHER PUBLICATIONS

"Adjustable Frequency AC Drives Application Guide", Eaton Corporation, Application Notes 53-403-2-R, Oct. 1992.
"Adjustable Frequency AC Drives Application Guide", Eaton Corporation, Application Notes 53-40-32-H, Nov. 1992.
"Electric Drive Applications Guide", Dynamatic, Rev. 1992 Ed., pp. 1-65.
"Introduction to Field Orientation and High Performance AC Drives", Coeditors D. W. Novotny and R. D. Lorenz, Presented Oct. 6-7 at the 1985 IEEE Industry Applications Society Annual Meeting, Toronto, Canada.
"A Stator Flux Oriented Induction Machine Drive", Xingyi Xu et al, WEMPEC Research Report 88-2.
"A Low Cost Stator Flux Oriented Voltage Source Variable Spped Drive", Y. Xue et al, 1990 IEEE-IAS Annual Meeting Record, pp. 410-415.

Primary Examiner—William M. Shoop, Jr.
Assistant Examiner—Karen Masih
Attorney, Agent, or Firm—Andrus, Sceales, Starke & Sawall

[57] ABSTRACT

In an AC drive, a method for stator flux oriented control of a waveform generator providing switching signals to an inverter supplying pulse width modulated current to a three-phase, variable frequency induction motor is provided. The method includes generating a quadrature axis stator voltage signal, a direct axis stator voltage signal, and a stator frequency signal to which switching signals from the waveform generator to the inverter are responsive.

21 Claims, 2 Drawing Sheets

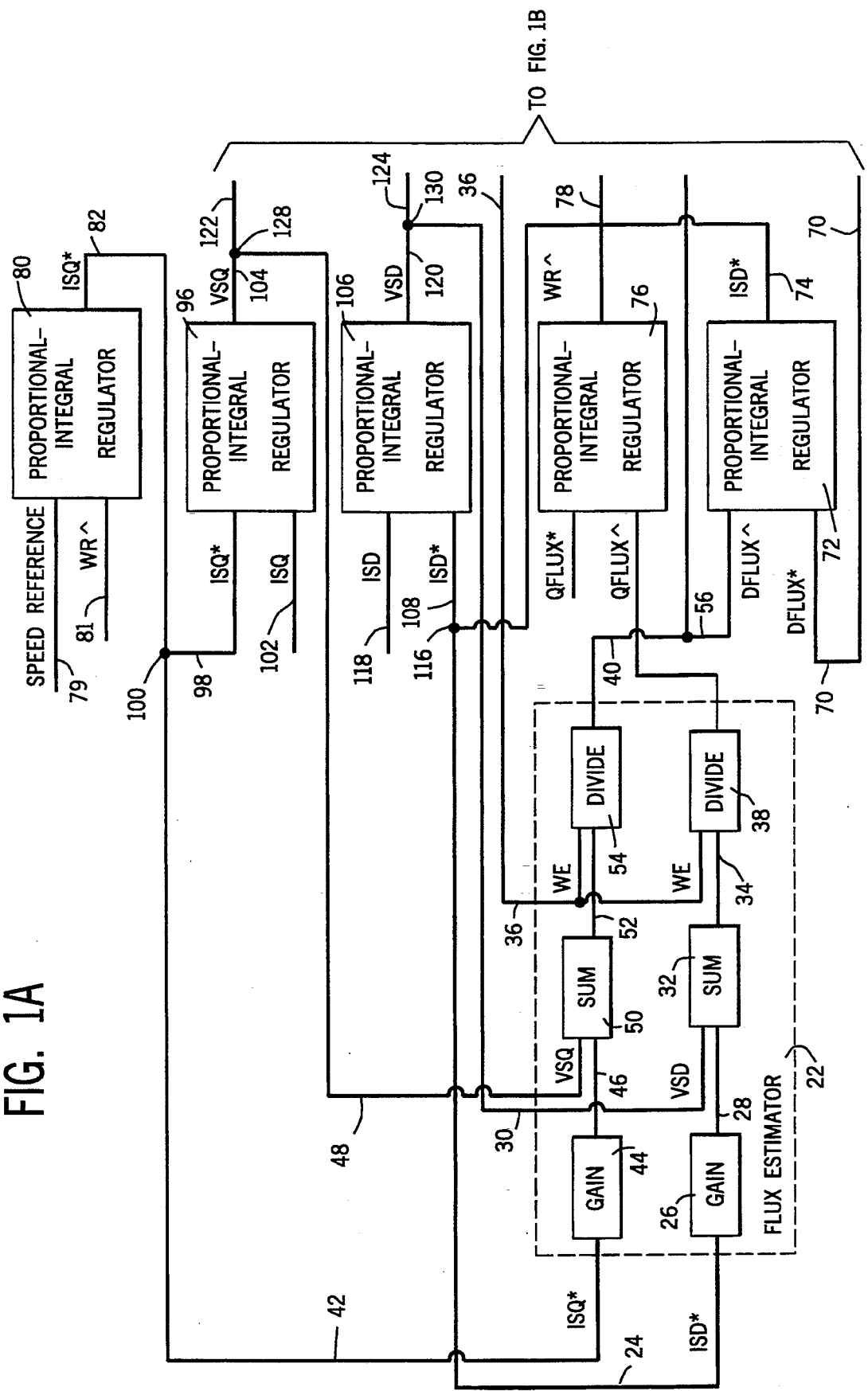

STATOR FLUX ORIENTED CONTROL

BACKGROUND AND SUMMARY OF THE INVENTION

This invention relates to AC drives and, in particular, the invention provides a method of stator flux oriented control for variable speed AC drives.

Existing variable speed AC drives are highly complicated and prone to nuisance trips. The complicated nature of existing drives translates into large amounts of engineering time in order to apply the drive to systems with unusual requirements. For the user, a complicated drive means complicated set up procedures, component failures, degradation, and drift.

Therefore, it is the primary objective of this invention to provide a control system for an AC drive which operates under all reasonably expected conditions of input, line, load, or customer adjustment.

A further objective of this invention is to provide a control system for an AC drive which operates independent of motor parameters.

An additional objective of this invention is to provide a control system for an AC drive which will operate without tripping under any conceivable load condition.

A still further objective of this invention is to provide a control system for an AC drive which is simple and low cost as compared to a conventional field oriented control which requires accurate knowledge of motor parameters and/or tachometer feedback.

A still further objective of this invention is to provide a control system for an AC drive which operates without a tachometer.

The method of stator flux oriented control to which this invention relates directs the switching signals from a waveform generator to an inverter supplying pulse width modulated current to a three-phase variable frequency induction motor. The present invention provides a simple implementation by using five proportional-integral regulators to control the AC drive, instead of the complex calculations required in prior art devices.

A three-phase, induction motor may be mathematically represented as a two-phase, induction motor having two axes of magnetic symmetry, direct axis and the quadrature axis. In order to mathematically translate the three-phase motor into a two-phase motor, the value of two of the three phase motor currents must be determined. A sensor is used to provide a reference frame converter with the values of the two phase currents. The reference frame converter mathematically calculates a quadrature axis stator current signal and a direct axis stator current signal from the two sensed phase currents and from a reference angle provided to the reference frame converter.

A flux estimator produces an estimated quadrature axis stator flux signal and an estimated direct axis stator flux signal. A flux reference generator produces a direct axis stator flux reference signal. The direct axis stator flux reference signal and the estimated direct axis stator flux signal are input into a flux amplitude regulator. The output of the flux amplitude regulator is a direct axis stator current reference signal.

The direct axis stator current signal and the direct axis stator current reference signal are inputted into a direct axis stator current regulator. The output of the direct axis stator current regulator is a direct axis stator voltage signal.

The estimated quadrature axis stator flux signal and a quadrature axis stator flux reference signal are input into a flux angle regulator. The output of the flux angular regulator is an estimate of the rotor speed of the induction motor.

The estimated rotor speed and a speed reference are inputted into a speed regulator. The output of the speed regulator is a quadrature axis stator current reference signal. A quadrature axis stator current regulator receives the quadrature axis stator current reference signal from the speed regulator and the quadrature axis stator current signal from the reference frame converter. The output of the quadrature axis stator current regulator is a quadrature axis stator voltage signal.

An estimated slip frequency is generated and combined with the estimated rotor speed signal to produce a stator frequency signal.

The direct axis stator voltage signal and the quadrature axis stator voltage signal are translated from rectangular coordinates to polar coordinates. This results in a voltage magnitude signal and a voltage angle signal. By adding the voltage angle signal to the integral of the stator frequency, a waveform reference angle signal is produced. The waveform reference angle signal and the voltage magnitude signal are inputted into the waveform generator. Responsive to these two signals, the waveform generator generates switching commands for the inverter. The waveform reference angle is also inputted into the reference frame converter as a necessary variable in calculating the two-phase motor representation of the three-phase motor.

BRIEF DESCRIPTION OF THE DRAWINGS

The drawing illustrates the best mode presently contemplated for carrying out the invention.

FIG. 1a is a block diagram of a portion of an AC drive incorporating the stator flux oriented control of this invention.

DETAILED DESCRIPTION OF THE PREFERRED EMBODIMENT

Figure 1B:
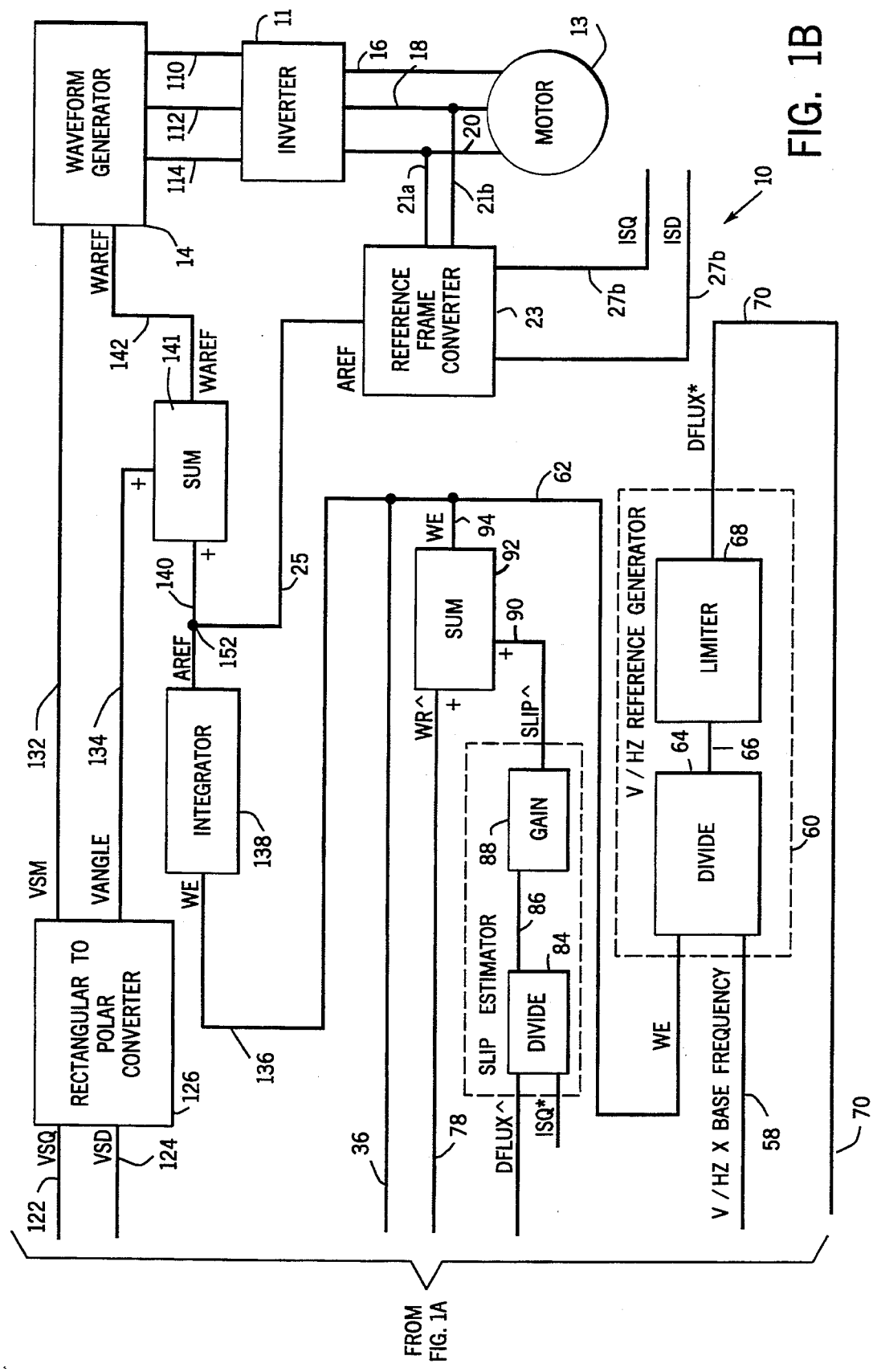
FIG. 1b is a block diagram of a portion of an AC drive incorporating the stator flux oriented control of this invention.

This invention relates to an AC drive and, in particular, a method for stator flux oriented control of a variable speed drive.

FIGS. 1a and 1b show a block diagram of an AC drive generally designated by the reference numeral 10 for use in conjunction with this invention. The drive 10 is comprised of an inverter 11, a waveform generator 14 and an AC motor 13. The AC drive system 10 converts three-phase, 60 hertz input power to an adjustable frequency and voltage source for controlling the speed of the AC motor 13. Bus lines 110, 112, and 114 interconnect the waveform generator 14 and the inverter 11. Lines 16, 18 and 20 interconnect the inverter 11 and the motor 13.

The method to which this invention relates is implemented by a commercially available MC68332 microcontroller incorporating a CPU32 core. The CPU32 core is programmed to execute the method of this invention according to the functional blocks shown in FIGS. 1a and 1b, representing programming steps.

A three-phase output signal across lines 16, 18, 20 is generated by AC drive 10 through inverter 11 to excite motor 13. The waveform generator 14, upon commands from the microprocessor, independently adjusts the voltage and the frequency of energization signals supplied by the inverter 11 to the motor 13.

As is known, a three-phase motor may be mathematically represented as a two-phase motor having two axes of magnetic symmetry. The axis in which magnetic flux is generated is known as the direct axis. The axis perpendicular to the direct axis is known as the quadrature axis. These expressions, direct axis and quadrature axis, are normally shortened to D-axis and Q-axis.

A reference frame converter 23 is provided in order to calculate a quadrature axis stator current feedback signal and a direct axis stator current feedback signal which mathematically represent the three-phase motor current. Reference frame converter 23 senses, through lines 21a, 21b, the current through two of the three phase output signals from the inverter 11 to the motor 13. A waveform reference angle, AREF, line 25, is inputted into the reference frame converter 23. Using the two phase currents and the waveform reference angle, the reference frame converter 23 calculates the quadrature axis stator current signal and the direct axis stator current signal, lines 27a, 27b.

The quadrature axis stator current is proportional to the torque generated by an induction motor. In order to increase the speed of a motor, the motor must generate more positive torque. Therefore, to increase the speed of the motor, the Q-axis stator current must be increased.

Similarly, the D-axis stator current is proportional to the flux of the motor. However, the principle of stator flux orientation requires the D-axis voltage to be close to zero. Because voltage is the rate change of flux, the D-axis voltage being zero corresponds to a Q-axis flux being zero. Therefore, by increasing a D-axis stator current, the flux of the motor or the D-axis stator flux is increased.

A flux estimator 22 estimates the Q-axis flux and the D-axis flux, shown in FIGS. 1a and 1b as QFLUXA and DFLUXA. The Q-axis flux estimate is calculated by multiplying, gain box 26, a D-axis stator current reference signal, shown in FIGS. 1a and 1b as ISD*, line 24, by a constant which approximates the D-axis stator resistance. The product, line 28, is the estimated voltage drop across the D-axis stator resistance.

The D-axis stator voltage, shown in FIGS. 1a and 1b as VSD, is inputted to the flux estimator 22, line 30. The stator resistance voltage drop is subtracted, sum box 32, from the D-axis stator voltage to produce a resultant voltage, line 34. The resultant voltage is divided, divide box 38, by the stator frequency, shown in FIGS. 1a and 1b as WE, line 36. The quotient is a Q-axis flux estimate, line 40.

The D-axis flux estimate is also calculated by flux estimator 22. A Q-axis stator current reference signal, shown in FIG. 1 as ISQ*, is multiplied by the Q-axis stator resistance, gain block 44, in order to provide an estimated voltage drop across the Q-axis stator resistance, line 46. The voltage drop across the Q-axis stator resistance, line 46, is subtracted, sum box 50, from the Q-axis stator voltage, line 48, to produce a resultant voltage, line 52. The voltage, line 52, is divided by the stator frequency, divide box 54, in order to provide a D-axis flux estimate, line 56.

A D-axis flux reference, DFLUX*, is generated so as to allow the motor to continue to run above base frequency at a constant voltage rather than at a constant flux. At line 58, the motor's volts per hertz set point is multiplied by the base frequency of the motor, thereby providing a voltage. The voltage, line 58, is divided by the stator frequency, divide box 64, thereby resulting in a volts per hertz or D-axis flux reference, line 66. A limiter 68 is provided so as to limit the value of the D-axis flux reference to the motor's volts per hertz set point. If the stator frequency, line 62, is below the base frequency, the output of the volts per hertz reference generator, line 70, is limited to the volts per hertz set point, line 58. If the stator frequency is larger than the base frequency, the output of the volts per hertz reference generator, line 70, is equal to the volts per hertz value at line 66.

The D-axis flux reference and the D-axis flux estimate are inputted into a proportional-integral regulator 72. As is known, a proportional-integral regulator takes the difference of the inputs and generates an error signal which is a linear function of the input. This error signal is inputted into the integral portion of the regulator which in turn generates a second signal which is proportional to the time integral of its input. The output of the proportional-integral regulator is then obtained by multiplying the second signal and the error signal by separately adjustable gains and summing the results. The output of proportional-integral regulator 72 is the D-axis stator current reference signal, ISD*, line 74.

Similarly, the estimated Q-axis stator flux and a Q-axis stator flux reference, QFLUX*, are inputted into proportional-integral regulator 76. As discussed above, the principles of stator flux orientation dictate that the Q-axis stator flux be zero. Hence, the Q-axis stator flux reference is set to zero. The output of the proportional-integral regulator, line 78, is an estimate of the motor's rotor speed, WRA.

The estimated rotor speed, line 81, and a speed reference, line 79, are, in turn, inputted into a proportional-integral regulator 80. The speed reference is the speed at which the operator desires the motor to rotate. The output of the proportional-integral regulator 80 at line 82 is the Q-axis stator current reference signal, ISQ*.

The Q-axis stator current reference signal is divided by the estimated D-axis stator flux, divide box 84. The resulting value, line 86, is multiplied by a predetermined gain, box 88, in order to calculate the estimated slip at line 90. The estimated slip, line 90, is added, sum box 92, to the estimated rotor speed, line 78. The output, line 94, of sum box 92 is the stator frequency.

The Q-axis stator current reference signal is inputted at line 98 into a proportional-integral regulator 96. Lines 42, 82, and 98 are tied together to form a junction 100. The Q-axis stator current feedback signal is also inputted, line 102, into proportional-integral regulator 96. The output, line 104, of proportional-integral regulator 96 is the Q-axis stator voltage, VSQ.

The D-axis stator current reference signal, line 108, is inputted into proportional-integral regulator 106. Lines 24, 74 and 108 are tied together to form a junction at 116. The D-axis stator current feedback signal, line 118, is also inputted into proportional-integral regulator 106. The output, line 120, of the proportional-integral regulator 106 is the D-axis stator voltage, VSD.

The Q-axis stator voltage and the D-axis stator voltage, lines 122 and 124 respectively, are inputted into a rectangular to polar converter 126. Lines 48, 104, and 122 form a junction 128. Lines 30, 120, and 124 form a junction 130. The rectangular to polar converter 126 converts the Q-axis stator voltage and the D-axis stator voltage from rectangular coordinates to polar coordinates. The output of the rectangular to polar converter 126 is a stator voltage magnitude, VSM, line 132, and a stator voltage angle, VANGLE, line 134.

The stator frequency, line 136, is integrated, integrator box 138, to generate a reference angle, AREF, line 140. As previously explained, the waveform reference angle, line 25, is input into the reference frame converter 23. Lines 25 and 40 form a junction 152.

The stator voltage magnitude, line 132, is fed into waveform generator 14. The angle, line 140, is added at sum box 141 to the stator frequency angle, line 134, to produce a waveform reference angle WAREF, line 142. The waveform reference angle, line 142, is input into the waveform generator 14.

In operation, the stator flux oriented control uses proportional-integral regulator 96 to compare the Q-axis stator current feedback signal with the Q-axis stator current reference signal. This, in turn, varies the Q-axis stator voltage signal.

Likewise, the D-axis stator current feedback signal is compared with the D-axis stator current reference signal. This, in turn, varies the D-axis stator voltage signal. The Q-axis and D-axis stator voltage signals are converted to polar coordinates and fed into a waveform generator. In response to the signals, the waveform generator varies the switching signals to the inverter such that the excitation signals from the inverter to the motor are adjusted in order that the stator currents more closely approximate the present values of the reference signals.

It can be seen through the description of this invention that various equivalents are possible without deviating from the scope and spirit of this invention.

I claim:

1. In an AC drive, a method for stator flux oriented control of a waveform generator providing switching signals to an inverter supplying pulse width modulated current to a three phase, variable frequency induction motor, comprising:
   generating a quadrature axis stator voltage signal;
   generating a direct axis stator voltage signal; and
   generating a stator frequency signal; and
   generating switching signals from the waveform generator to the inverter in response to the quadrature axis stator voltage signal, the direct axis stator voltage signal, and the stator frequency signal.

2. In an AC drive, a method for stator flux oriented control of a waveform generator providing switching signals to an inverter supplying pulse width modulated current to a three phase, variable frequency induction motor, comprising the steps of:
   generating an estimated quadrature axis stator flux signal;
   generating an estimated direct axis stator flux signal;
   generating a direct axis stator flux reference signal;
   generating a direct axis stator current reference signal in response to the estimated direct axis stator flux signal and the direct axis stator flux reference signal;
   supplying a quadrature axis stator flux reference signal;
   generating an estimated rotor speed signal in response to the estimated quadrature axis stator flux signal and the quadrature axis stator flux reference signal;
   supplying a direct axis stator current signal;
   generating a direct axis stator voltage signal in response to the direct axis stator current reference signal and the direct axis stator current signal;
   supplying a speed reference signal;
   generating a quadrature axis stator current reference signal in response to the speed reference signal and the estimated rotor speed signal;
   supplying a quadrature axis stator current signal;
   generating a quadrature axis stator voltage signal in response to the quadrature axis stator current reference signal and the quadrature axis stator current signal;
   generating an estimated slip signal;
   combining the estimated slip signal and the estimated rotor speed signal so as to produce a stator frequency signal to the waveform generator; and
   generating switching signals from the waveform generator to the inverter in response to the quadrature axis stator voltage signal, the direct axis stator voltage signal, and the stator frequency signal.

3. The method of claim 2 wherein the estimated direct axis stator current reference signal is generated by a proportional-integral regulator.

4. The method of claim 2 wherein the estimated rotor speed signal is generated by a proportional-integral regulator.

5. The method of claim 2 wherein the direct axis stator voltage signal is generated by a proportional-integral regulator.

6. The method of claim 2 wherein the quadrature axis stator current reference signal is generated by a proportional-integral regulator.

7. The method of claim 2 wherein the quadrature axis stator voltage signal is generated by a proportional-integral regulator.

8. The device of claim 2 wherein the quadrature axis flux reference signal has a value of zero volts per hertz.

9. In an AC drive, a method for stator flux oriented control of a waveform generator for providing switching signals to an inverter supplying pulse width modulated current to a three phase, variable frequency induction motor, comprising the steps of:
   generating a direct axis stator current signal;
   generating a direct axis stator current reference signal;
   generating a quadrature axis stator current signal;
   generating a quadrature axis stator current reference signal;
   generating a direct axis stator voltage signal in response to the direct axis stator current reference signal and the direct axis stator current signal;
   generating a quadrature axis stator voltage signal in response to the quadrature axis stator current reference signal and a quadrature axis stator current signal;
   generating a stator frequency signal; and
   generating switching signals from the waveform generator to the inverter in response to the quadrature axis stator voltage signal, the direct axis stator voltage signal, and the stator frequency signal.

10. The method of claim 9 further comprising the steps of:
   generating an estimated direct axis stator flux signal;
   generating an estimated quadrature axis stator flux signal;
   generating a direct axis stator flux reference signal;
   supplying a quadrature axis stator flux reference signal;
   generating an estimated rotor speed signal;
   supplying a speed reference signal; and
   generating an estimated slip signal.

11. The method of claim 10 wherein the estimated rotor speed signal is generated in response to the estimated quadrature axis stator flux signal and the quadrature axis stator flux reference signal.

12. The method of claim 10 wherein the direct axis stator current reference signal is generated in response to the estimated direct axis stator flux signal and a direct axis stator flux reference signal.

13. The method of claim 10 wherein the quadrature axis stator current reference signal is generated in response to the speed reference signal and the estimated rotor speed signal.

14. The method of claim 10 wherein the direct axis stator current signal and the quadrature axis stator current signal are generated in response to current supplied from the inverter to the induction motor.

15. The method of claim 10 wherein the stator frequency signal is generated by combining the estimated slip signal and the estimated rotor speed signal.

16. The method of claim 10 wherein the direct axis stator current reference signal is generated by a proportional-integral regulator.

17. The method of claim 10 wherein the estimated rotor speed signal is generated by a proportional-integral regulator.

18. The method of claim 10 wherein the quadrature axis stator current reference signal is generated by a proportion-integral regulator.

19. The method of claim 10 wherein the direct axis stator voltage signal is generated by a proportional-integral regulator.

20. The method of claim 10 wherein the quadrature axis stator voltage signal is generated by a proportional-integral regulator.

21. The method of claim 10 wherein the quadrature axis flux reference signal has a value of zero volts per hertz.

* * * * *